US005671244A

United States Patent [19]
Reeder

[11] Patent Number: 5,671,244
[45] Date of Patent: *Sep. 23, 1997

[54] MIRROR MOUNT

[75] Inventor: Dennis Reeder, South Jordan, Utah

[73] Assignee: Spectra—Physics Lasers, Inc., Mountain View, Calif.

[*] Notice: The term of this patent shall not extend beyond the expiration date of Pat. No. 5,590,149.

[21] Appl. No.: 691,806

[22] Filed: Jul. 31, 1996

Related U.S. Application Data

[63] Continuation of Ser. No. 527,564, Sep. 13, 1995, Pat. No. 5,590,149.
[51] Int. Cl.$^6$ ........................................................ H01S 3/08
[52] U.S. Cl. ............................ 372/107; 372/98; 372/108
[58] Field of Search ................................. 372/107, 108, 372/98

[56] References Cited

U.S. PATENT DOCUMENTS 5,590,149  12/1996  Reeder ........................................ 372/107

Primary Examiner—Leon Scott, Jr.
Attorney, Agent, or Firm—Wilson Sonsini Goodrich & Rosati

[57] ABSTRACT

A mirror mount assembly has a base plate positioned at one end of a laser resonator, and a movable plate spaced from and positioned substantially parallel to the base plate. One or more elastic springs are connected between the base plate and the moveable plate to provide tip and tilt of the movable plate and translation of the moveable plate away from or towards the base plate. The elastic springs include a bushing made of an elastic material, and at least three elastic dimples formed in the bushing circumferentially in a plane across a bushing longitudinal axis. Further, the elastic spring has a bushing made of an elastic material capable of elastic expansion and contraction. The bushing includes a threaded interior side and a longitudinal axis from a first open end of the bushing to a second open end of the bushing. At least three elastic dimples are formed in the bushing circumferentially in a plane across the bushing longitudinal axis and extend into the bushing threaded interior side to flexibly contact one or more threads of a screw received in the bushing threaded interior. The dimples permit rotation of the bushing and screw relative to each other to advance and retract the screw along the longitudinal axis, and provide a selected and maintainable adjustment of the screw along the bushing's longitudinal axis with reduced mechanical hysteresis of the screw.

13 Claims, 4 Drawing Sheets

MIRROR MOUNT

This is a continuation of U.S. Ser. No. 08/527,564, filed Sep. 13, 1995, entitled "Mirror Mount" now U.S. Pat. No. 5,590,149.

BACKGROUND OF THE INVENTION

1. Field of the Invention

This invention relates generally to a mirror mount assembly, and more particularly to a mirror mount assembly including a dimpled bushing and a threaded screw that provides selectable and maintainable adjustment of the mirror with reduced mechanical hysteresis of the threaded screw.

2. Description of Related Art

Conventional mirror mounts, such as those typically associated with optical components, are generally not suitable to position mirrors utilized in laser applications. Typically, conventional mirror mounts are suspended from a base support structure by a system of screw jacks and springs.

Laser mirrors are normally affixed to a plate that is suspended from and movable with respect to a back up support plate firmly mounted to an optical bench. Since laser beams are generally directed substantially horizontally, the mirror surfaces are typically perpendicular to gravitational forces. Thus, the mirrors are cantilevered from the surface of a support back up plate and must rigidly support a relatively heavy weight suspended therefrom.

A series of springs in conventional mounts between the ridged support plate and the moveable plate from which the mirror is mounted provides a force that maintains one or more mirror actuators and compression or tension, thereby stabilizing the mirror. However, conventional type spiral springs have little or no resistance to shear forces which are large and heavy laser mirrors cantilevered from the rigid mount. Therefore, pins or ball type sockets are generally required to support the moveable plate. These supporting devices introduce frictional hysteresis that inherently reduces the required positional accuracy of laser minors.

Further, where screw type actuation is manually or mechanically manipulated to position mirrors, some type of locking mechanism is required. During activation of the locking mechanism positioning errors may be introduced. For example, the simple procedure of tightening a set screw to lock a mirror usually requires much tedious and time consuming trial and error to align one or more mirrors to a desired setting.

Additionally, the efficiency of a laser is critically dependent on the angular alignment of the optical components defining the laser resonator. The mirror alignment of a field laser system is jeopardized by mechanical vibrations and ambient temperature changes unavoidably transmitted to the mirror mount assemblies.

There is a need for a mirror mount assembly which provides precision alignment and adjustment of a mirror. Further, there is a need for a mirror mount assembly with reduced mechanical hysteresis applied to a threaded screw. It would also be desirable to provide a mirror mount assembly where vibration, shock and changes in temperature minimally affect the alignment of the mirror.

SUMMARY OF THE INVENTION

An object of the present invention is to provide a mirror mount assembly for a laser.

Another object of the present invention is to provide a mirror mount assembly which provides improved precision of mirror alignment than those mounts currently available.

Still another object of the present invention is to provide a mirror mount assembly with reduced mechanical hysteresis applied to a threaded screw.

Yet another object of the present invention is to provide a mirror mount assembly which reduces the need to adjust the minor mount, particularly when the laser is in the field.

Still another object of the invention is to provide a mirror mount assembly where vibration, shock and changes in temperature minimally affect the alignment of the mirror.

A further object of the present invention is to provide a mirror mount assembly which includes one or more circumferential elastic springs that connect a base plate and a moveable plate.

Another object of the present invention is to provide a mirror mount assembly including a bushing with a threaded interior side, at least three elastic dimples formed in the bushing circumferentially in a plane extending into the bushing threaded interior side to flexibly contact one or more threads of a screw positioned in the bushing's threaded interior side.

These and other objects of the invention are achieved in a mirror mount assembly with a base plate positioned at one end of a laser resonator, and a movable plate spaced from and positioned substantially parallel to the base plate. One or more elastic springs connect the base plate and the moveable plate to provide tip and tilt of the movable plate and translation of the moveable plate away from or towards the base plate. The elastic springs include a bushing, and at least three elastic dimples formed in the bushing circumferentially in a plane across a bushing longitudinal axis.

Further, the bushing is made of a material capable of elastic expansion and contraction. The bushing includes a threaded interior side and a longitudinal axis from a first open end of the bushing to a second open end of the bushing. At least three elastic dimples are formed in the bushing circumferentially in a plane across the bushing longitudinal axis and extend into the bushing threaded interior side to flexibly contact one or more threads of a screw received in the bushing threaded interior side. The dimples permit rotation of the bushing and screw relative to each other to advance and retract the screw along the longitudinal axis, and provide a selected and maintainable adjustment of the screw along the bushing's longitudinal axis with reduced mechanical hysteresis of the screw.

The dimples are slightly larger than threads of the threaded screw. The bushing can be divided into first, second and third sections. The first and third sections have substantially the same diameter, while the intermediate second has a larger diameter. One or more dimples are formed. Preferably, the first and third sections each include three dimples.

DETAILED DESCRIPTION

Figure 1:
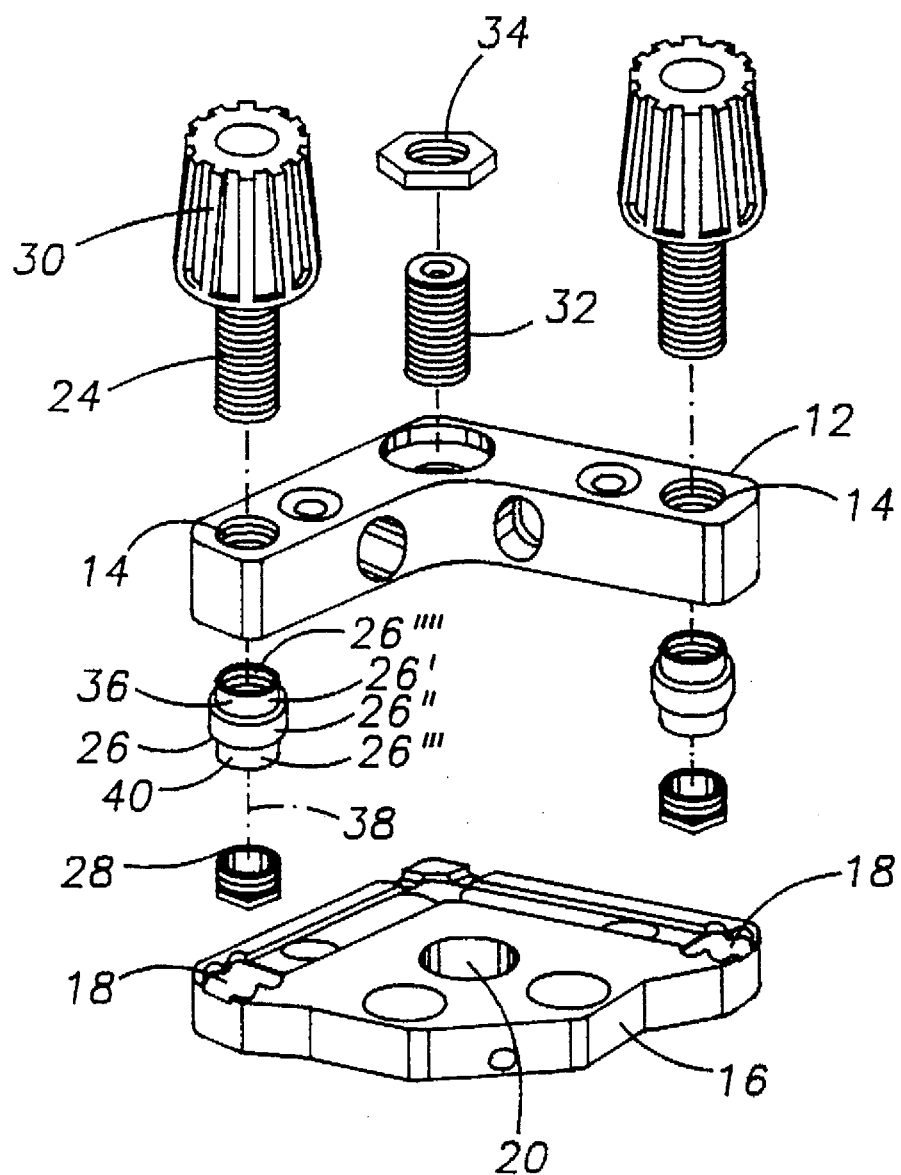
FIG. 1 is an exploded view of the mirror mount of the present invention.
Figure 2:
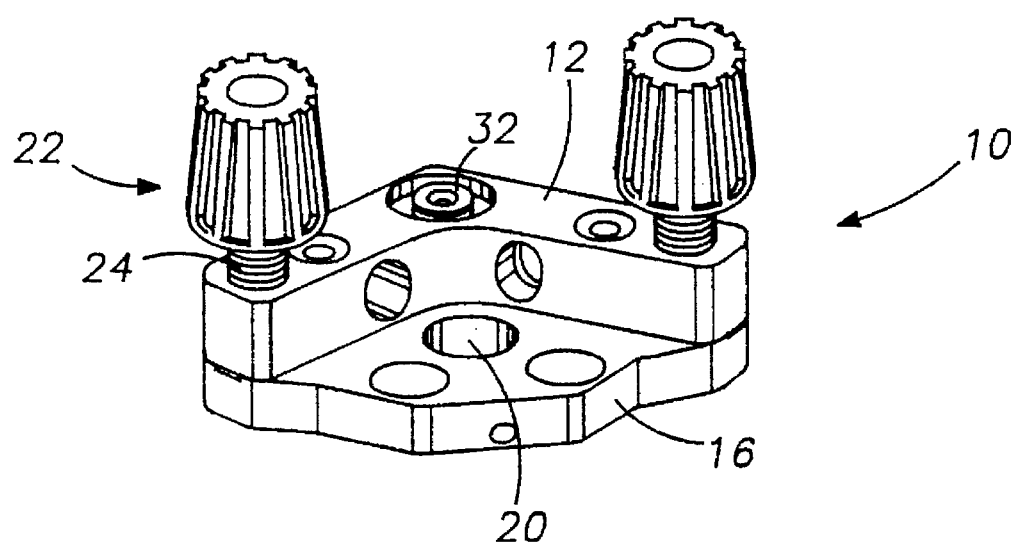
FIG. 2 is a perspective view of the mirror mount of the present invention.

Referring now to FIGS. 1 and 2, a mirror mount assembly 10 includes a base plate 12 generally positioned at one end of a laser resonator (not shown) that includes one or more base plate mounting apertures 14, and a moveable plate 16 spaced from and positioned substantially parallel to base plate 12. Moveable plate 16 includes one or more moveable plate mounting apertures 18. A mirror or other optical element (not shown) is mounted, retained or positioned in mirror receiving aperture 20. One or more circumferential elastic springs 22 connect and retain base plate 12 to moveable plate 16, and provide adjustment of moveable plate 16 relative to base plate 12 in order to adjust alignment of the mirror.

Circumferential elastic spring 22 includes one or more threaded screws 24, one or more bushings 26, a locking member 28 including but not limited to a standard nut, and an adjustment knob 30.

In one embodiment, bushing 26 includes a first section 26' with a first diameter, a second section 26" with a second diameter which is larger than the first diameter, and a third section 26''' with a third diameter that is substantially equal to the first diameter.

In this embodiment, threaded screw 24 is screwed into position through a base plate mounting aperture 14. A bushing interior 26'''' is threaded and adapted to receive threaded screw 24. First section 26' of bushing 26 is received in base plate mounting aperture 14. Third section 26''' is received in movable plate mounting aperture 18. Second section 26" provides a separation between base plate 12 and moveable plate 16.

Threaded screw 24 is threaded in base plate mounting aperture 14, is received in a threaded bushing interior 26'''', passes through moveable plate mounting aperture 18 and is retained by lock 28.

As illustrated in FIGS. 1 and 2, a third threaded screw 32 held within associated locking nut 34 is received in a third base plate mounting aperture. Third threaded screw 32 provides a rigid point between base plate 12 and moveable plate 16. In this manner, first and second circumferential elastic springs 22 are positioned in two base plate mounting apertures 14 and two moveable plate mounting apertures 18. In this embodiment, adjustment of circumferential elastic springs 22 provides tip and tilt of moveable plate 16 and it's translation away from or towards base plate 12. This permits movement of moveable plate 16 relative to base plate 12 and 2 orthogonal directions. Utilization of third threaded screw 32 and locking nut 34 provides a pivot point for the two circumferential elastic springs 22.

Adjustment knob 30 is threaded onto an end of threaded screw 24 and imparts movement of moveable plate 16 relative to base plate 12. If one circumferential elastic spring 22 is provided, then adjustment of mirror mount assembly 10 is in one orthogonal direction. If two circumferential elastic springs 22 are provided there is movement of mirror mount assembly 10 in two orthogonal directions. Finally, if three circumferential elastic springs 22 are included then mirror mount assembly 10 is capable of movement in three orthogonal directions.

Bushing 26 includes a first dimple, or a first plurality of dimples 36 formed in the bushing housing circumferentially in a plane that extends across a bushing longitudinal axis 38 through bushing interior 26''''. In one embodiment, the first dimple or first plurality of dimples 36 are formed in first section 26'. In another embodiment, a second dimple or second plurality of dimples 40 is formed in third section 26'''. The plurality can include only two dimples. However, three dimples are preferred in order to define a plane. Dimples 36 and 40 are formed circumferentially around the exterior of bushing 26. It will be appreciated that one dimple may be formed, two is more preferred, and three are most preferred. Further, each plurality of dimples 36 and 40 need not be formed to define a plane. In this regard, each dimple in a plurality can be staggered so that a plane is not formed, or only two dimples are in the same plane.

First and second dimples 36 and 40 are created by applying a force to the exterior of bushing 26. This force causes a portion of an exterior of bushing 26 to extend into bushing interior 26''''. Dimples 36 and 40 flexibly contact one or more threads of threaded screw 24 to provide a selectable and minimal adjustment of threaded screw 24 along bushings longitudinal axis 38 with reduced mechanical hysteresis of threaded screw 24.

Figure 3:
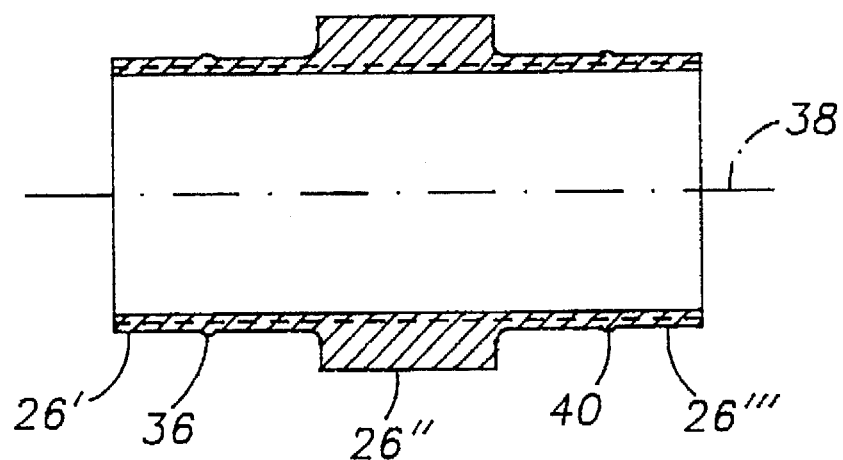
FIG. 3 is a cross-sectional view of the bushing of the present invention.

Bushing 26 is more clearly illustrated in FIG. 3. As shown, bushing 26 includes first section 26', second section 26", as well as, third section 26'''. First plurality of dimples 36 are formed at an exterior of first section 26', the second plurality of dimples 40 is formed at an exterior of third section 26'''. In one embodiment, the outer diameter of first and third sections 26' and 26''' respectively is about 0.2620 inches, plus or minus 0.0007 inches, the outside diameter of second section 26" is about 0.341 inches, plus or minus 0.001 inch, the length of bushing 26 is about 0.540 inches, the length of first section 26' is approximately 0.190 inches, the length of second section 26" is about 0.190 inches and the length of third section 26''' is about 0.160 inches. It will be appreciated that although FIG. 3 illustrates an embodiment of bushing 26 with first section 26', second section 26" and third section 26''', it is possible that bushing 26 only have one section of substantially the same diameter. Additionally bushing 26 can have two sections, each with a different diameter. In any event bushing 26 includes at least one set of dimples 36 that is formed on its smallest diameter section.

Bushing 26 can be made of an elastic material, a deformable material, and the like. In one embodiment, it is made of a leaded phosphor bronze. First and second dimples 36 and 40, either singularly or in combination, cause bushing 26 to become an elastic bushing. Bushing 26 is preferably made of an elastic material that is capable of expansion and contraction as it is threaded around threaded screw 24. Dimples 36 and 40 are elastic because bushing 26 is made of an elastic material. It is this elasticity, imparted by dimples 36 and 40 that takes the play and backlash out of the screw threads of threaded screw 24, regardless of the imperfections in threaded screw 24 itself. Each dimple 36 and 40 respectfully, contacts more than one thread of threaded screw 24. Utilization of dimples 36 and 40 in bushing 26 prevents any relative movement between threaded screw 24 and bushing 26. The end result is mirror mount assembly 10 which provides precision alignment and adjustment of a mirror for a resonator. Vibration, shock, and changes in temperature do not affect the alignment of the mirror in the resonator.

Figure 4:
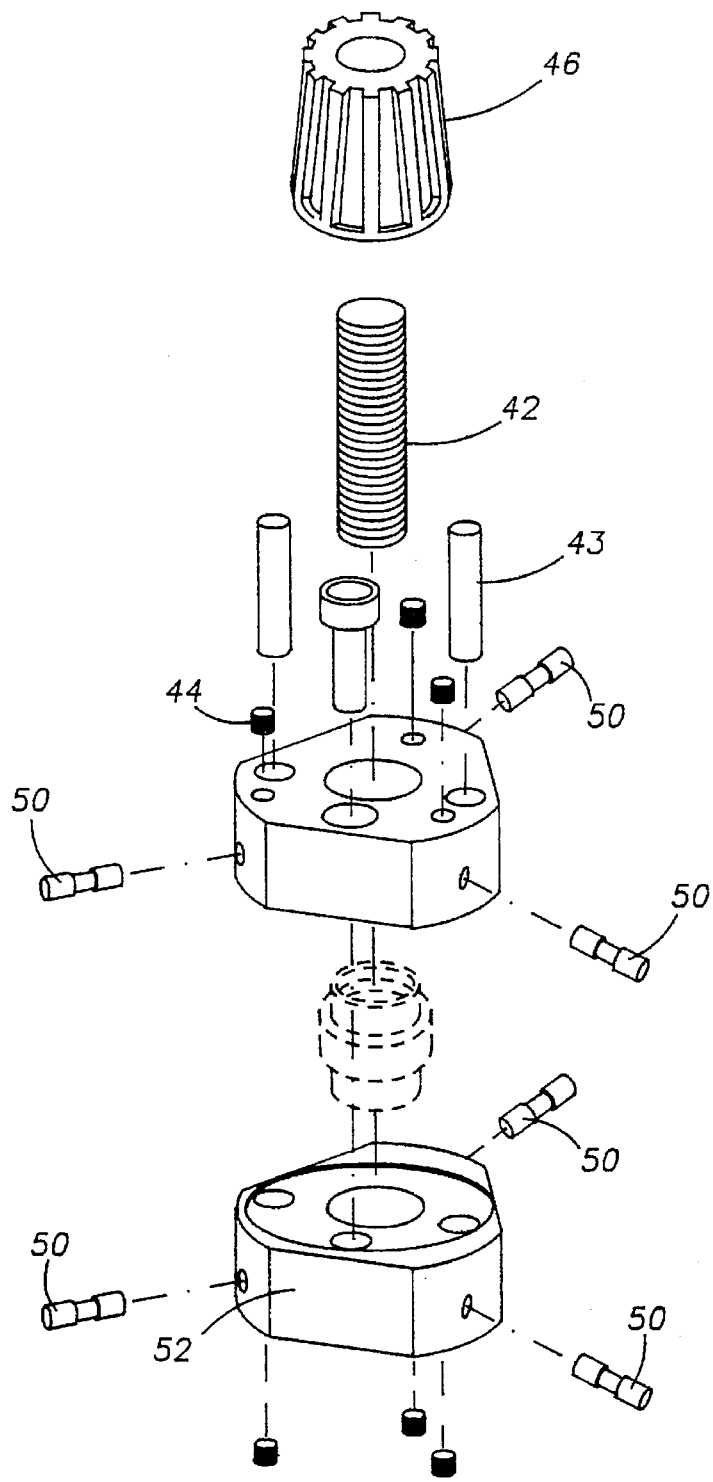
FIG. 4 is an expanded view of the mandrel assembly used to form the dimples in the bushing.

The methods for dimpling bushing 26 are illustrated in FIG. 4. It is critical to control the amount of pressure force applied to bushing 26 to make dimples 36 and 40. For this reason, dimples 36 and 40 are formed against a precision mandrel 42. Mandrel 42 is ground enough undersize to form a pitch diameter of the screw threads so that it accommodates spring back. Bushing 26 is dimpled down mandrel 42 which has a different diameter than the diameter of threaded screw 24.

As illustrated in FIG. 4, the apparatus for creating the dimpling of bushing 26 includes precision mandrel 42, a plurality of a ball plunges 44, a knob 46, a standard dowel 48, a plurality of drill blanks 50, one or more mandrel housings 52, and a standard punch 54. Precision mandrel 42 allows the creation of a desired level of dimpling. Each dimple 36 or 40 extends slightly beyond the width of a thread of threaded screw 24. The level of elasticity of dimples 36 and 40 is repeatable. Dimples 36 and 40 are elastic in order to conform to the shape of threaded screw 24 and take out the backlash and slop that individual screw threads of threaded screw 24 create. Dimples 36 and 40 grip threaded screw 24 at all times, relative movement between threaded screw 24 and bushing 26 is eliminated by dimpling bushing 26. This provides for precision optical alignment and adjustment when there is vibration, shock, or changes in temperature.

Bushing 26 is thinned down to use an interference fit and the elastic condition of dimples 36 and 40 to create precision adjustment.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A mirror mount assembly, comprising:

a base plate positioned at one end of a laser resonator;

a movable plate spaced from and positioned substantially parallel to the base plate; and a spring coupled between the base plate and the moveable plate to provide tip and tilt of the movable plate away from or towards the base plate;

a bushing made of an elastic material, the bushing including a threaded interior side, a longitudinal axis and at least three elastic dimples formed in the bushing circumferentially in a plane substantially perpendicular to the bushing longitudinal axis, wherein the dimples are dimensioned to be smaller than a screw thread and configured to permit rotation of the bushing and screw relative to each other to advance and retract the screw along the longitudinal axis and provide a selected adjustment of the screw along the bushing's longitudinal axis with reduced mechanical hysteresis of the screw.

2. The mirror mount assembly of claim 1, wherein the bushing includes at least one thin walled section.

3. The mirror mount assembly of claim 2, wherein the dimples are formed in the thin walled section.

4. The mirror mount assembly of claim 3, wherein the bushing is made of a deformable material.

5. The mirror mount assembly of claim 4, wherein the bushing is made of leaded phosphor bronze.

6. The mirror mount assembly of claim 1, wherein a precision mandrel having a smaller diameter than a diameter of the bushing is positioned with the bushing in a housing, and the dimples are formed in an exterior surface of each bushing as the exterior surface of the bushing is pressed against an exterior surface of the mandrel.

7. The mirror mount assembly of claim 1, wherein the bushing has a first section with a first wall thickness, and an adjacent second section with a second wall thickness that is larger than the first section.

8. The mirror mount assembly of claim 1, wherein the bushing has a first section with a first wall thickness, a second section with a second wall thickness that is larger than the first wall thickness, and a third section having a wall thickness substantially equal to the first wall thickness, wherein the second section is between the first and third sections.

9. A mirror mount assembly, comprising:

a base plate positioned at one end of a laser resonator including one or more base plate mounting apertures;

a movable plate spaced from and positioned substantially parallel to the base plate including one or more moveable plate mounting apertures; and one or more threaded screws, each screw being receiving in a base plate mounting aperture and a corresponding base plate mounting aperture to provide tip and tilt of the movable plate and translation of the moveable plate away from or towards the base plate;

one or more bushings, each bushing corresponding to a threaded screw and including a threaded interior side and a longitudinal axis, each bushing including at least three elastic dimples formed circumferentially in a plane that is substantially perpendicular to a bushing longitudinal axis, wherein the dimples are smaller than a width of a thread of the screw.

10. The mirror mount of claim 9, wherein the dimples permit rotation of the bushing and screw relative to each other to advance and retract the screw along the longitudinal axis, and provide a selected and maintainable adjustment of the screw along the bushing's longitudinal axis with reduced mechanical hysteresis of the screw.

11. The mirror mount of claim 9, wherein the bushing is formed of a first section with a first diameter, a second section with a second diameter that is larger than the first diameter, and a third section with a third diameter that is substantially equal to the first diameter.

12. The mirror mount of claim 11, wherein the bushing includes a first plurality of dimples formed in the first section, and a second plurality of dimples formed in the second section.

13. The mirror mount of claim 12, wherein the first plurality of dimples are formed circumferentially in a first plane substantially perpendicular to the bushing longitudinal axis, and the second plurality of dimples are formed circumferentially in a second plane substantially perpendicular to the bushing longitudinal axis.

* * * * *